«12» United States Patent
Hirose (10) Patent No.: US 8,031,386 B2
(45) Date of Patent: Oct. 4, 2011

(54) GALVANO MOTOR AND GALVANO MOTOR SYSTEM (75) Inventor: Kenji Hirose, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/428,307

(22) Filed: Apr. 22, 2009

(65) Prior Publication Data

US 2009/0261773 A1  Oct. 22, 2009

(30) Foreign Application Priority Data

Apr. 22, 2008  (JP) ................... 2008-111291

(51) Int. Cl.
G02B 26/08  (2006.01)

(52) U.S. Cl. ............... 359/200.1; 359/198.1; 359/199.1; 359/221.3; 250/236

(58) Field of Classification Search .... 359/198.1–200.8, 359/212.1–221.4, 223.1–226.2; 250/234–236
See application file for complete search history.

(56) References Cited

U.S. PATENT DOCUMENTS

2005/0128553 A1*  6/2005  Toyama et al. ............... 359/225

FOREIGN PATENT DOCUMENTS

JP  2003-084224  3/2003

* cited by examiner

*Primary Examiner* — James Phan
(74) *Attorney, Agent, or Firm* — Canon USA Inc IP Division (57) ABSTRACT A galvano motor 10 includes a motor shaft 1, a coil 5 which rotationally drives the motor shaft 1, and an encoder scale 6 which is joined to one end of the rotating shaft, the motor shaft 1 is configured so that a mirror 9 which is heavier than the encoder scale 6 at the other end opposite to the one end to which the encoder scale 6 is joined, a phase crossover frequency fphase in open-loop characteristics of the galvano motor 10, a torsion resonance frequency fscale between a center part of the motor shaft 1 and the encoder scale 6, and a torsion resonance frequency fmirror between the center part of the motor shaft 1 and the mirror 9 satisfy the relation of fphase<fscale≦fmirror, and phases at the torsion resonance frequencies fscale and fmirror are other than −180 degrees.

3 Claims, 6 Drawing Sheets

FIG. 1

DIAGRAM OF REALISTIC MODEL
FIG. 2A

DIAGRAM OF MASS SYSTEM MODEL
FIG. 2B

GALVANO MOTOR AND GALVANO MOTOR SYSTEM

BACKGROUND OF THE INVENTION

1. Field of the Invention

The present invention relates to a galvano motor and a galvano motor system which scan or deflect an optical axis of light.

2. Description of the Related Art

Recently, there has been a processing machine such as a laser drilling machine, a laser marker, or an optical forming machine, which continuously scans or positions to irradiate a laser light beam, heats to burn an object to be processed by the laser energy, and sublimates or hardens a light curing resin to process it to be a desired shape. A galvano motor has been used for scanning or positioning the laser light beam in the processing machine.

The characteristics required for the galvano motor is a response and an accuracy of the scanning or the positioning. In order to improve the response of the galvano motor, it has been designed in considering lowering inertia of the motor, heightening the torque, and lowering impedance. Furthermore, when a galvano motor system is constituted by the combination of the galvano motor and a motor controller, frequency response characteristics of a motor which are capable of heightening a control gain have been required.

In order to improve the accuracy of the galvano motor, for example, a capacitance type or an optical type angle position sensor is getting larger, the sensitivity is improved by a multiple division, or the compensation is performed by a differential circuit. Furthermore, recently, a galvano motor in which an encoder is used as an angle position sensor has also been realized.

Figure 6:
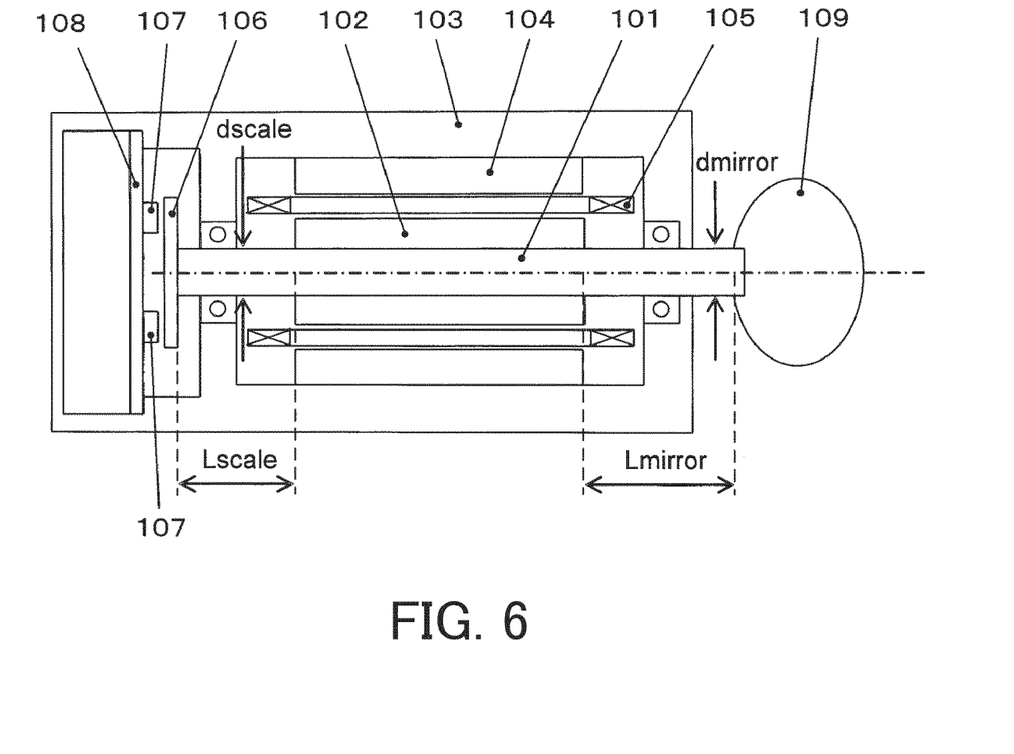
FIG. 6 is a cross-sectional view showing a schematic configuration of a conventional galvano motor.

FIG. 6 is a cross-sectional view showing a schematic configuration of a conventional galvano motor. In FIG. 6, reference numeral 101 denotes a motor shaft, and reference numeral 102 denotes a magnet which is fixed on a substantially central part of the motor shaft 101. Reference numeral 103 denotes a motor case, and reference numeral 104 denotes a fixed yoke which is fixed on the motor case 103 and constitutes a magnetic circuit in cooperation with the magnet 102. Reference numeral 105 denotes a coil which is fixed on the fixed yoke 104 and rotationally drives the magnet 102 and the motor shaft 101.

Reference numeral 106 denotes an encoder scale which is fixed on one end of the motor shaft 101 and has a grid for obtaining angle information (position information). Reference numeral 107 denotes a sensor which reads grid information of the encoder scale 106, and reference numeral 108 denotes a board on which the sensor 107 is mounted. The board 108 converts the information read by the sensor 107 to an electric signal. Reference numeral 109 denotes a mirror and is directly joined to the other end of the motor shaft 101.

As a conventional art shown in FIG. 6, generally, a straight shaft is often used as a motor shaft 101. Inertia of the mirror 109 to be driven is often greater than that of the encoder scale 106. Furthermore, a distance Lmirror between the magnet 102 and the mirror 109 is often greater than a distance Lscale between the magnet 102 and the encoder scale 106.

Specific numerical values in this conventional art are as follows: Gmirror=206 [GPa], Ipmirror=Dmirror$^4$/32= 0.004$^4$/32 [m$^4$], Imirror=0.8$^{-7}$ [Kgm$^2$], Lmirror=0.015 [m], Gscale=206 [GPa], Ipscale=Dscale$^4$/32=0.004$^4$/32 [m$^4$], Iscale=0.6$^{-7}$ [Kgm$^2$], and Lscale=0.012 [m].

Here, Gmirror is modulus of transverse elasticity of a material of the motor shaft 101 between the magnet 102 and the mirror 109. Ipmirror is polar moment of inertia of area of the motor shaft 101 between the magnet 102 and the mirror 109. Dmirror is a diameter of the motor shaft 101 between the magnet 102 and the mirror 109. Imirror is inertia of the mirror 109. Lmirror is a length between the magnet 102 and the mirror 109.

Gscale is modulus of transverse elasticity of a material of the motor shaft 101 between the magnet 102 and the encoder scale 106. Ipscale is polar moment of inertia of area of the motor shaft 101 between the magnet 102 and the encoder scale 106. Dscale is a diameter of the motor shaft 101 between the magnet 102 and the encoder scale 106. Iscale is inertia of the encoder scale 106. Lscale is a length between the magnet 102 and the encoder scale 106.

When using the above numerical values, a linear torsional resonance frequency fmirror between the magnet 102 and the mirror 109 and a linear torsional resonance frequency fscale between the magnet 102 and the encoder scale 106 are calculated. In this conventional art, the torsional resonance frequencies fmirror and fscale are 5898 Hz and 7614 Hz, respectively.

Since a motor controller of the galvano motor using an encoder as an angle position detector utilizes position information obtained from a digital signal without reducing the accuracy, typically, a digital control circuit is used.

Figure 7A:
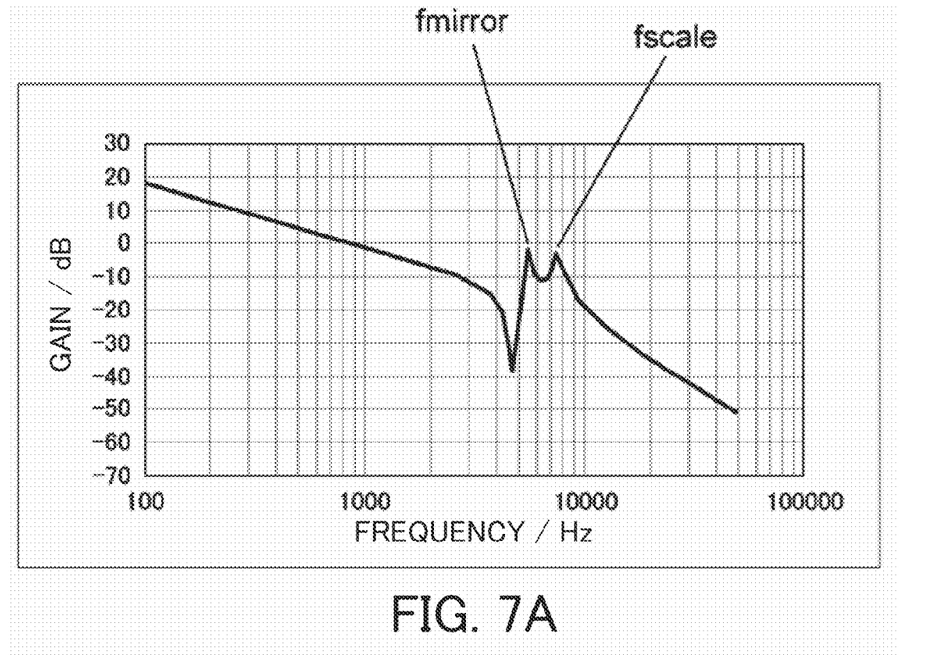
FIGS. 7A and 7B are charts of frequency characteristics of a conventional galvano motor system.
Figure 7B:
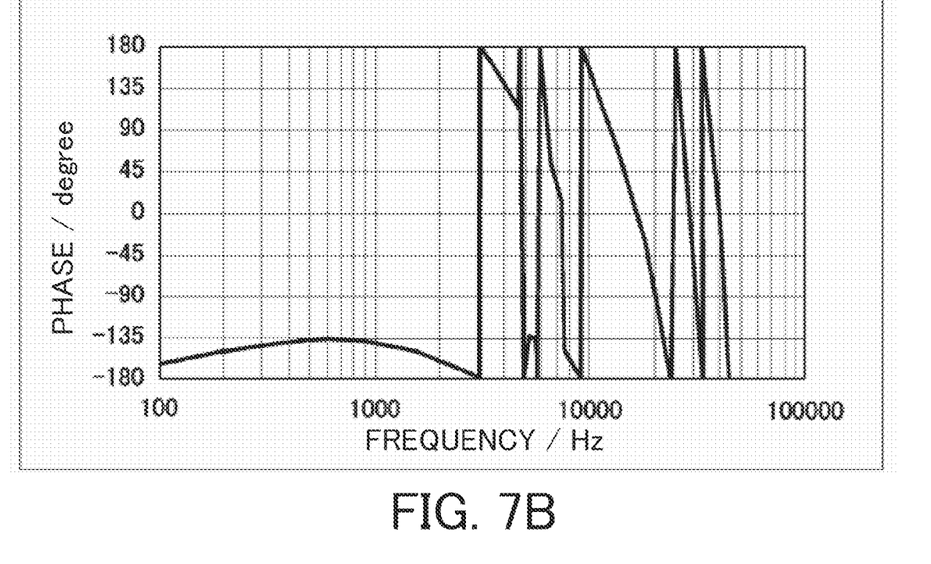

FIGS. 7A and 7B are diagrams of frequency characteristics of a conventional galvano motor. FIG. 7A is gain characteristics and FIG. 7B is phase characteristics. A Bode diagram shown in FIGS. 7A and 7B shows open-loop frequency characteristics when the conventional galvano motor shown in FIG. 6 is driven at a sampling period of around 40 kHz.

As shown in FIG. 7A, the torsional resonance frequency fscale is higher than the torsional resonance frequency fmirror. Furthermore, as shown in FIG. 7B, because of a phase delay caused by a sampling period of a motor controller, the phase crossover frequency, i.e. the frequency whose phase is −180 degrees, is around 3 kHz.

In the phase characteristics of the conventional art, the phase proceeds by 180 degrees by the antiresonance just before the torsional resonance frequency fmirror and delays again by 180 degrees at the torsional resonance frequency fmirror. Further, it delays by 180 degrees at the torsional resonance frequency fscale. Thus, when the resonance is generated at a side of the encoder that is a sensor rather than the motor controller, the phase delays by 180 degrees. In contrast, when the resonance is generated at a side of the mirror opposite to the encoder rather than the motor controller, the phase delays by 180 degrees after it returns by 180 degrees.

According to Bode theorem, if the gain does not exceed 0 dB at the phase crossover point in a Bode diagram, the control system is stable. If the phase does not cross −180 degrees even when the gain exceeds 0 dB, the control system is stable. Therefore, as the conventional art, when the resonance is generated at the mirror side at a frequency slightly higher than the phase crossover frequency, the phase crosses −180 degrees at the torsional resonance frequency fmirror and the gain exceeds 0 dB. Therefore, the control system is unstable and the oscillation state is caused. In order to avoid this, typically, a notch filter is applied to the torsional resonance frequency fmirror.

However, when the notch filter is applied, a phase delay is generated at an area of a frequency lower than the frequency, and the phase crossover frequency is lowered. Therefore, it is difficult to heighten the control gain and the response of the motor is deteriorated.

Japanese Patent Laid-Open No. 2003-84224 discloses a control method of a galvano scanner for scanning an irradiation position of a laser beam with a mirror driven.

As described above, since a discrete processing is performed in a digital control, a dead time element is generated. As a result, when viewed in what is called frequency characteristics in a Bode diagram, a phase delay is generated.

The resonance frequency in a mechanical system is close to the phase crossover frequency (a frequency whose phase is −180 degrees) in the realistic range although they depend upon the size of the motor or the sensor and the ability of an arithmetic element used for the control. Therefore, if a various kind of filters such as a low-pass filter and a notch filter are not used, it is difficult to improve the control gain which directly influences the response of the motor.

In the galvano motor using such a digital control, there are problems as follows, and the improvement of the performance has been difficult.

First, in the digital control system, because a phase delay is generated by a dead time element caused by the sampling, the phase crossover point is lowered. The control band can not exceed the phase crossover frequency. Therefore, the control gain also needs to be lowered and the response of the motor or the force to suppress a disturbance is reduced.

Second, in order to handle the resonance of the motor, typically, a control filter such as a notch filter is also constituted by a digital calculation. However, if the variety or the order of filters increases, the calculation load increases and the sampling period of the control needs to be longer. Furthermore, since the phase crossover frequency is lowered by the influences of the filter itself, it is difficult to improve the control gain.

BRIEF SUMMARY OF THE INVENTION

The present invention provides a galvano motor and a galvano motor system which can rotationally deflect an optical axis of a light beam with high accuracy and high velocity.

A galvano motor as one aspect of the present invention is a galvano motor configured to scan or deflect light from a light source. The galvano motor includes a rotating shaft, a rotating drive unit configured to rotationally drive the rotating shaft, and a rotating angle detector which is joined to one end of the rotating shaft. The rotating shaft is configured so that a deflection member which is heavier than the rotating angle detector at the other end opposite to the one end to which the rotating angle detector is joined. When the deflection member is joined to the rotating shaft, a phase crossover frequency fphase in open-loop characteristics of the galvano motor, a torsion resonance frequency fscale between a center part of the rotating shaft and the rotating angle detector, and a torsion resonance frequency fmirror between the center part of the rotating shaft and the deflection member satisfy the relation of fphase<fscale≦fmirror. Phases at the torsion resonance frequencies fscale and fmirror are other than −180 degrees.

A galvano motor system as another aspect of the present invention includes the galvano motor, and a motor controller configured to compare a target angle information with a rotating angle information from the rotating angle detector and perform a digital control of a rotating drive operation of the rotating shaft so that a difference between the target angle information and the rotating angle information.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
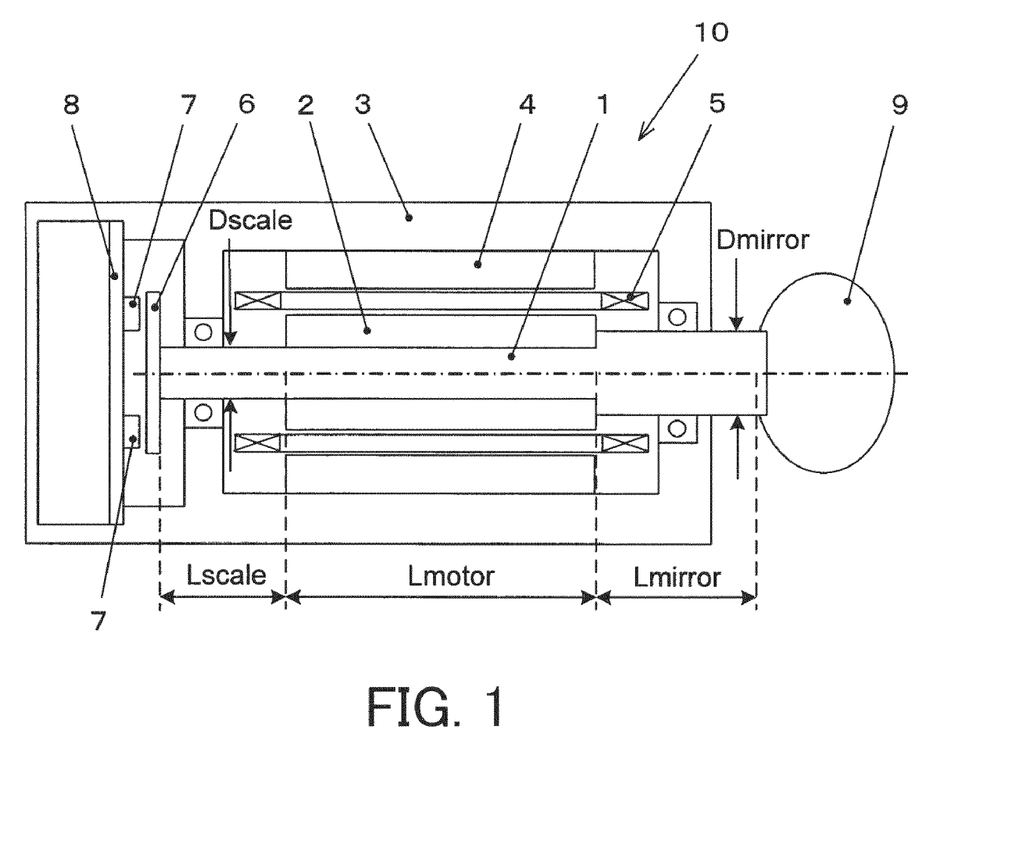
FIG. 1 is a cross-sectional view showing a schematic configuration of a galvano motor in the present invention.

First, the basic configuration of a galvano motor in the present embodiment will be described. FIG. 1 is a cross-sectional view showing a schematic configuration of a galvano motor in the present embodiment.

In FIG. 1, reference numeral 10 denotes a galvano motor. The galvano motor 10 is for example used for scanning or deflecting light from a light source. Reference numeral 1 denotes a motor shaft (a rotating shaft). A mirror 9 joined to the motor shaft 1, which will be described later, rotates in accordance with the rotation of the motor shaft 1. Reference numeral 2 denotes a magnet. The magnet 2 is fixed on a substantially central part of the motor shaft 1. Reference numeral 3 denotes a motor case. Each component of the galvano motor 10 is incorporated in the motor case 3.

Reference numeral 4 denotes a fixed yoke. The fixed yoke 4 is fixed on the motor case 3 and constitutes a magnetic circuit in cooperation with the magnet 2. Reference numeral 5 denotes a coil (a rotating drive unit). The coil 5 is fixed on the fixed yoke 4 and rotationally drives the motor shaft 1 and the magnet 2.

Reference numeral 6 denotes an encoder scale (a rotating angle detector). The encoder scale 6 is joined to one end of the motor shaft 1 and rotates similarly to the motor shaft 1. The encoder scale 6 is provided with a grid for obtaining rotating angle information (position information) which changes in accordance with the rotation of the motor shaft 1.

Reference numeral 7 denotes a sensor. The sensor 7 reads grid information of the encoder scale 6. Reference numeral 8 denotes a board on which the sensor 7 is mounted. The board 8 converts the grid information of the encoder scale 6 read by the sensor 7 into an electric signal.

Thus, the encoder scale 6, the sensor 7, and the board 8 are used as a rotating angle detector for obtaining rotating angle information of the motor shaft 1. In the present embodiment, instead of these, another rotating angle detector may be used if the rotating angle can be detected.

Reference numeral 9 denotes a mirror (a deflection member). The mirror 9 is joined to the other end opposite to one end of the motor shaft 1 to which the encoder scale 6 is joined.

The mirror 9 reflects an irradiated laser light beam to deflect it. Thus, the mirror 9 can control a direction of the laser light beam by changing a mirror angle (a mirror position) in accordance with a rotating operation of the motor shaft 1 to control the mirror angle of the mirror 9.

In the galvano motor 10 of the present embodiment, the mirror 9 is configured so as to be detachable from the motor shaft 1. Thus, the galvano motor 10 of the present embodiment can attach a various kind of mirrors in accordance with its usage. Commonly, the mirror 9 is heavier than the encoder scale 6 and a range of the weight of the mirror which is applicable is defined in accordance with a specification of the galvano motor.

As shown in FIG. 1, the motor shaft 1 of the present embodiment has a predetermined diameter (a shaft diameter) from a substantially central part where the magnet 2 is fixed up to one end where the encoder scale 6 is attached. This diameter is represented as Dscale. The motor shaft 1 has a diameter Dmirror which is greater than the diameter Dscale at the vicinity of the one end where the mirror 9 is attached. Thus, the motor shaft 1 constitutes a stepped shaft. In other words, the diameter Dmirror of the motor shaft 1 at a joint side of the mirror 9 is greater than the diameter Dscale of the motor shaft 1 at a joint side of the encoder 6.

In FIG. 1, the length (distance) of the motor shaft 1 between the extreme left of the magnet 2 and the encoder scale 6 is defined as Lscale, and the length of the motor shaft 1 between the extreme right of the magnet 2 and the mirror 9 is defined as Lmirror. Further, the length of the motor shaft 1 between the extreme left and the extreme right of the magnet 2 is defined as Lmotor. In this case, in the range of the lengths Lscale and Lmotor, the diameter of the motor shaft 1 is Dscale. On the other hand, in the range of the length Lmirror, the diameter of the motor shaft 1 is Dmirror.

Thus, a polar moment of inertia of area Ip and a torsional rigidity can be improved by setting the diameter Dmirror at a side of the mirror 9 to a value greater than the diameter Dscale at a side of the encoder scale 6.

Figure 2A:
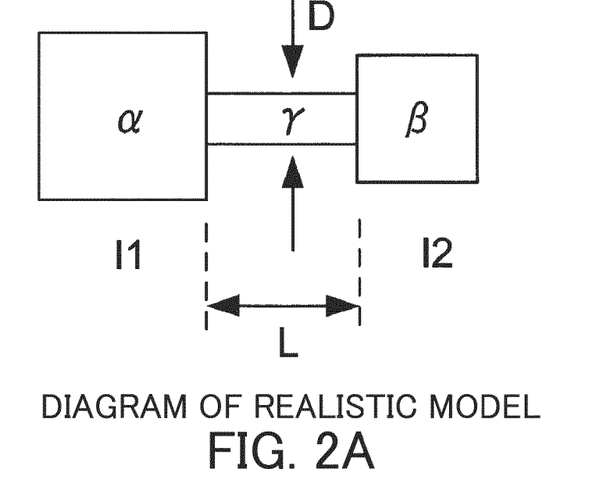
FIGS. 2A and 2B are diagrams of parameters influencing a torsional spring constant.
Figure 2B:
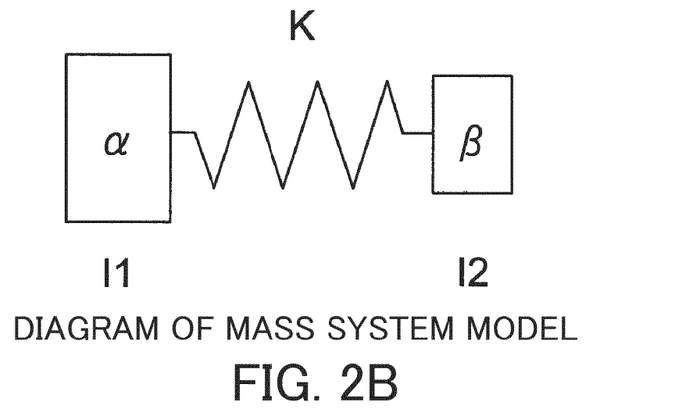

Hereinafter, the torsional rigidity (torsional spring constant) will be described. FIG. 2 is a diagram of parameters influencing the torsional spring constant.

FIG. 2A is a diagram of a realistic model and shows a state where an object α of inertia I1 and an object β of inertia I2 are coupled with a shaft γ having a length L and a diameter D. FIG. 2B is a diagram of a mass system model which corresponds to the realistic model of FIG. 2A, and shows a state where the object α of inertia I1 and the object β of inertia I2 are coupled with a spring γ' having a torsional spring constant K.

In this case, when modulus of transverse elasticity of the material of the shaft γ is defined as G and polar moment of inertia of area is defined as Ip, the torsional spring constant K is represented by expression 1.

$$K = \frac{G \cdot Ip}{L} \quad (1)$$

As seen in expression 1, the torsional spring constant K changes in accordance with the change of the material of the shaft γ, the length of the shaft γ, or the cross-sectional shape of the shaft. For example, when the cross-sectional shape of the shaft γ is a solid round bar, the polar moment of inertia of area Ip is represented by expression 2 and it is understood that it is proportional to the fourth power of the diameter D of the shaft γ.

$$Ip = \frac{D^4}{32} \quad (2)$$

Thus, when the shaft γ is constituted by a solid round bar, the torsional spring constant K is determined by the material, the diameter D, and the length L of the shaft γ. However, a desired torsional spring constant K can also be obtained by gradually changing the diameter D of the shaft γ in a direction of the length L or by changing the cross-sectional shape of the shaft γ to a cornered shape or the like.

Next, a torsional resonance frequency in the galvano motor of the present embodiment will be described.

Figure 3:
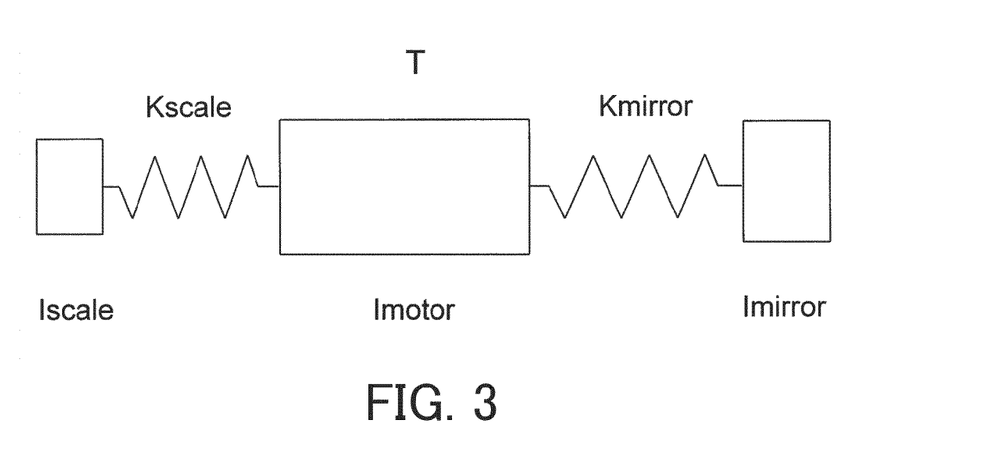
FIG. 3 is a model diagram of a mass system showing a mass and a rigidity of a galvano motor in the present embodiment.

FIG. 3 shows a mass and a rigidity of the galvano motor in the present embodiment with a model diagram of a simple mass system. Realistic model is not a mass system and also includes a damping term. However, the basic concept of the realistic model is not different from that of the mass system. Therefore, hereinafter, the description will be given using the mass system.

In FIG. 3, Iscale, Imotor, and Imirror indicate inertias of the encoder scale 6, the magnet 2, and the mirror 9 of the galvano motor 10, respectively. Kscale indicates a torsional spring constant between the magnet 2 and the encoder scale 6, and Kmirror indicates a torsional spring constant between the magnet 2 and the mirror 9.

In the embodiment, polar moment of inertia of area between the magnet 2 and the encoder scale 6 is defined as Ipscale, the length between them is defined as Lscale, and modulus of transverse elasticity of the material of the motor shaft 1 is defined as Gscale. Further, polar moment of inertia of area between the magnet 2 and the mirror 9 is defined as Ipmirror, the length between them is defined as Lmirror, and modulus of transverse elasticity of the material of the motor shaft 1 is defined as Gmirror.

In this case, the torsional spring constants Kscale and Kmirror are represented by expressions 3 and 4, respectively.

$$Kscale = \frac{Gscale \cdot Ipscale}{Lscale} \quad (3)$$

$$Kmirror = \frac{Gmirror \cdot Ipmirror}{Lmirror} \quad (4)$$

In the embodiment, a linear torsional resonance frequency between the magnet 2 and the encoder scale 6 of the galvano motor 10 (between the center part of the motor shaft 1 and the encoder scale 6) is defined as fscale. Furthermore, a linear torsional resonance frequency between the magnet 2 and the mirror 9 (between the center part of the motor shaft 1 and the mirror 9) is defined as fmirror. In this case, the torsional resonance frequencies fscale and fmirror are represented by the following expressions 5 and 6, respectively.

$$fscale[Hz] = \frac{1}{2\pi}\sqrt{\frac{Kscale}{Iscale}} \quad (5)$$
$$= \frac{1}{2\pi}\sqrt{\frac{Gscale \cdot Ipscale}{Lscale \cdot Iscale}}$$

$$fmirror[Hz] = \frac{1}{2\pi}\sqrt{\frac{Kmirror}{Imirror}} \quad (6)$$
$$= \frac{1}{2\pi}\sqrt{\frac{Gmirror \cdot Ipmirror}{Lmirror \cdot Imirror}}$$

As described above, the motor shaft 1 of the present embodiment is constituted by a stepped shaft. In other words, the diameter Dmirror of the motor shaft 1 at the side of the mirror 9 is greater than the diameter Dscale which is at a side of the encoder scale 6.

The motor shaft 1 of the present embodiment is constituted by a solid round bar. The polar moment of inertia of area Ip of the motor shaft 1 can be obtained by $D^4/32$ (D is a diameter of the motor shaft). Therefore, the polar moment of inertia of areas Ipscale of the motor shaft 1 at the side of the encoder scale 6 can be obtained by $Dscale^4/32$, and the polar moment of inertia of area Ipmirror of the motor shaft 1 at the side of the mirror 9 can be obtained by the $Dmirror^4/32$. Therefore, Ipmirror is greater than the Ipscale.

In the galvano motor of the present embodiment, the inertia Imirror of the mirror 9 to be driven is greater than the inertia Iscale of the encoder scale 6. Further, the length Lmirror between the magnet 2 and the mirror 9 is greater than the length Lscale between the magnet 2 and the encoder scale 6.

Specifically, the galvano motor of the present embodiment has the following values: Gmirror=206 [GPa], Ipmirror=$Dmirror^4/32$=$0.0055^4/32$ [$m^4$], Imirror=$0.9^{-7}$ [$Kgm^2$], Lmirror=0.015 [m], Gscale=206 [GPa], Ipscale=$Dscale^4/32$=$0.004^4/32$ [$m^4$], Iscale=$0.6^{-7}$ [$Kgm^2$], and Lscale=0.012 [m].

When the above values are substituted in expressions 5 and 6, the torsional resonance frequencies fmirror and fscale are obtained as 10513 Hz and 7614 Hz, respectively. Thus, according to the galvano motor of the present embodiment, the torsional resonance frequency fmirror (10513 Hz) at a side of the mirror 9 is higher than the torsional resonance frequency fscale (7614 Hz) at a side of the encoder scale 6.

Next, a motor controller which controls the galvano motor 10 of the present embodiment will be described.

Figure 4:
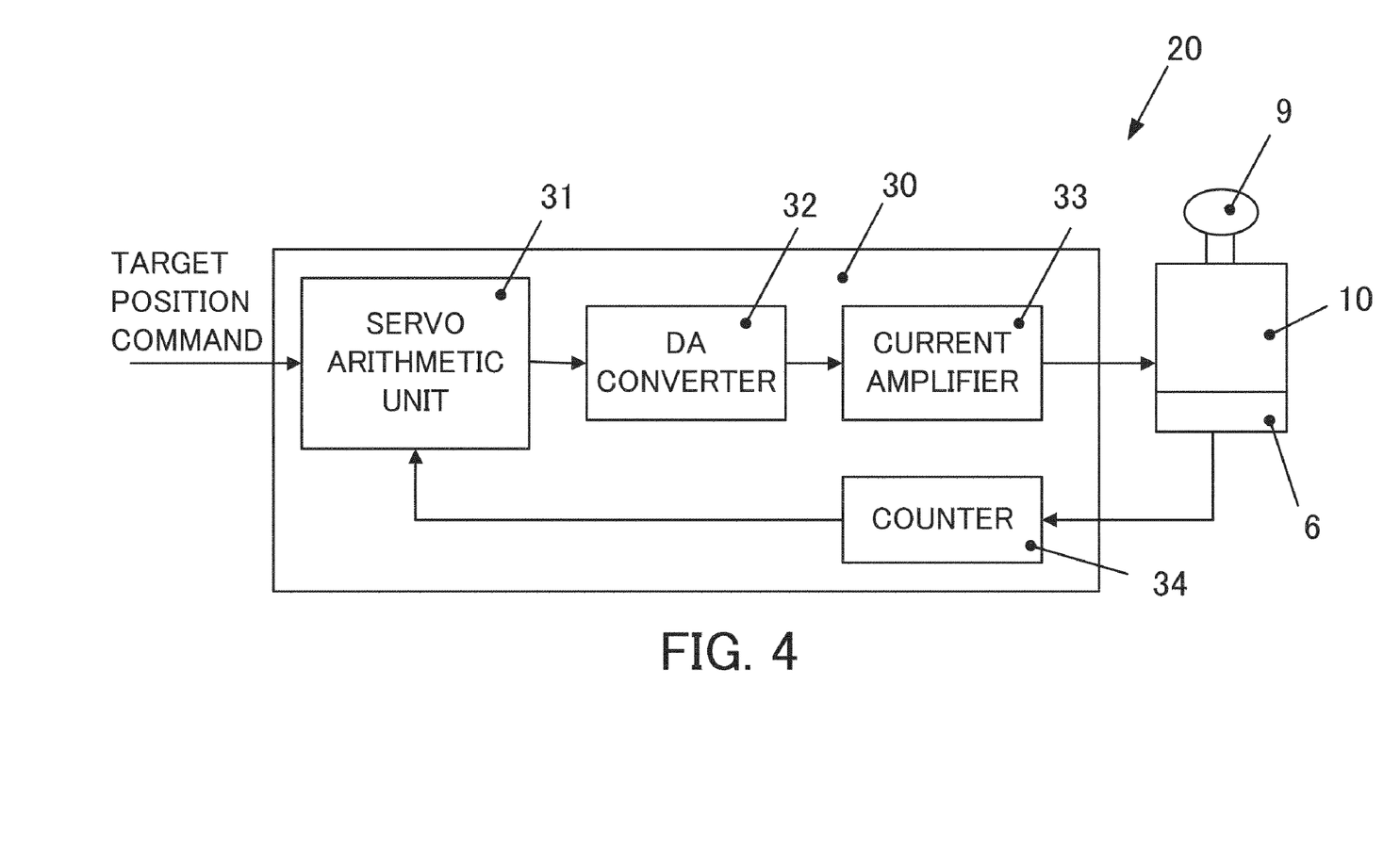
FIG. 4 is a block diagram of a galvano motor in the present embodiment.

FIG. 4 is a block diagram of a galvano motor system in the present embodiment. The galvano motor system 20 includes a galvano motor 10 and a motor controller 30 which controls the rotating operation of the galvano motor.

The motor controller 30 includes a servo arithmetic unit 31, a DA converter 32, a current amplifier 33, and a counter 34. The servo arithmetic unit 31 performs a digital calculation of a rotating amount required for moving the motor shaft 1 of the galvano motor 10 to a target position (a target angle) based on a target position command outputted from a higher-level controller (not shown) and a signal outputted from the counter 34. The result is outputted as a digital signal.

The DA converter 32 converts the digital signal outputted from the servo arithmetic unit 31 to an analog signal. The current amplifier 33 amplifies the analog signal outputted from the DA converter 32 and applies the amplified analog signal to the coil 5 of the galvano motor 10.

The motor shaft 1 of the galvano motor 10 performs a rotating operation in accordance with an amount of current applied to the coil 5. The mirror 9 rotates in accordance with the rotation of the motor shaft 1. Thus, the motor controller 30 can control the rotating angle of the mirror 9 (the mirror position) by controlling the amount of current applied to the galvano motor 10.

When the motor shaft 1 rotates, the encoder scale 6 which is fixed on one end of the motor shaft 1 also rotates. The counter 34 counts output signals from the encoder scale 6 to obtain angle information (position information) of the mirror 9. The output signals of the counter 34 indicate a current position of the motor 9.

Therefore, the servo arithmetic unit 31 compares the target position command with the output signals of the counter 34 to be able to calculate an amount of rotation required for moving from a current position up to a target position. The servo arithmetic unit 31 performs a current command for the galvano motor 10 based on the target position which has been received at a sampling period of 20 kHz to 100 kHz for example and the current position.

Thus, the motor controller 30 compares the target angle information with the rotating angle information from the mirror 9 to perform a digital control of the rotating drive operation of the motor shaft 1 so that the difference between the target angle information and the rotating angle information is reduced.

Next, frequency characteristics in the case where the galvano motor 10 is controlled using the motor controller 30 will be described.

Figure 5A:
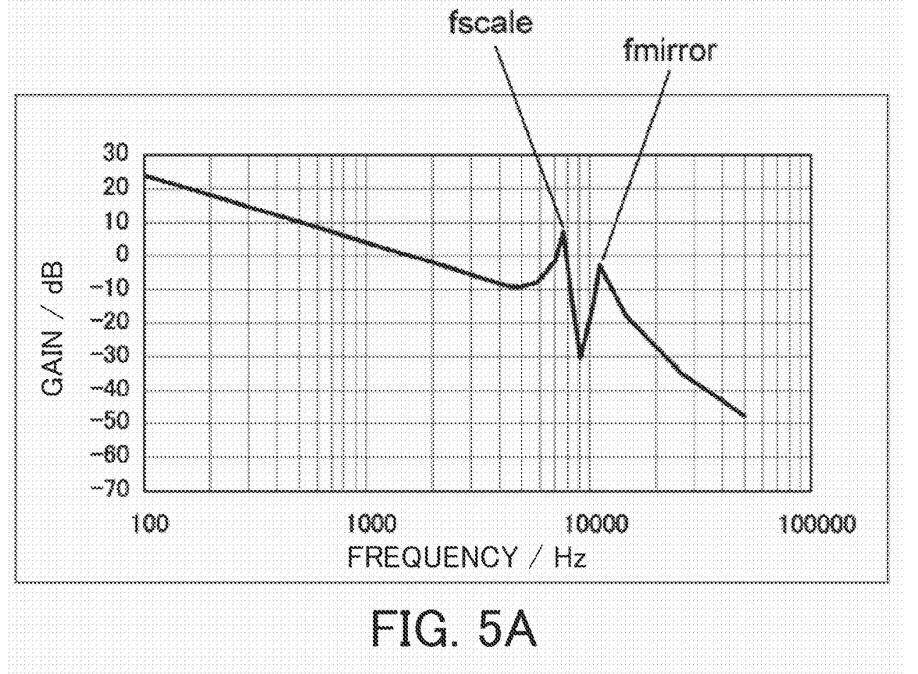
FIGS. 5A and 5B are charts of frequency characteristics of a galvano motor system in the present embodiment.
Figure 5B:
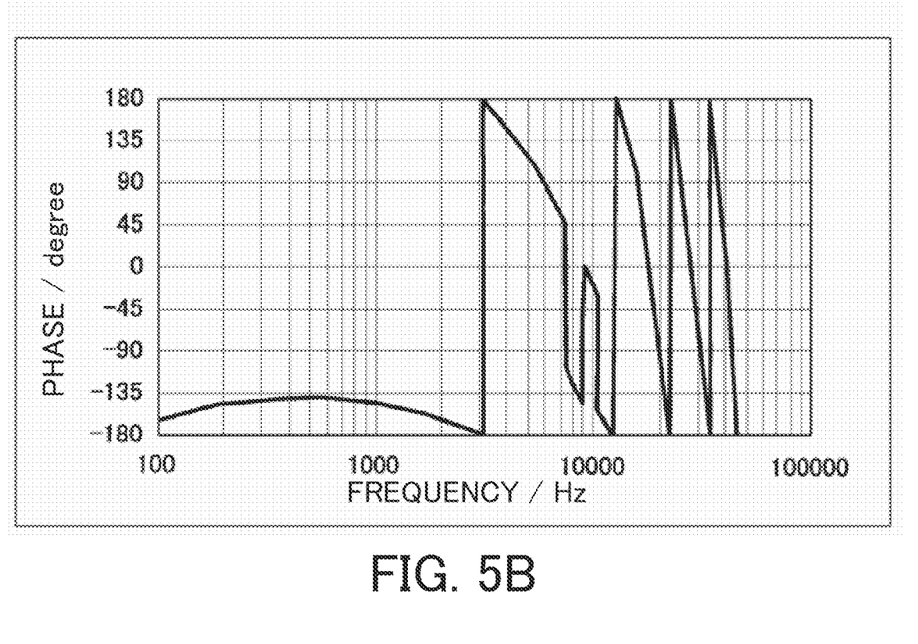

FIGS. 5A and 5B are frequency characteristics of the galvano motor in the present embodiment. FIG. 5A is gain characteristics and FIG. 5B is phase characteristics. FIGS. 5A and 5B show one example of a Bode diagram representing open-loop frequency characteristics.

As shown in FIG. 5B, because of a phase delay of the motor controller 30, a phase crossover frequency fphase, i.e. a frequency whose phase is equal to −180 degrees, is around 3 kHz. In the phase characteristics of the motor controller 30, the phase delays by 180 degrees at the torsional resonance frequency fscale. Further, the phase proceeds by 180 degrees by the antiresonance just before the torsional resonance frequency fmirror and it delays again by 180 degrees at the torsional resonance frequency fmirror.

Thus, if the resonance is generated at the encoder scale side of the galvano motor, the phase delays by 180 degrees when viewed from the encoder scale. In contrast, if the resonance is generated at the mirror side opposite to the sensor, the phase delays by 180 degrees after returning by 180 degrees.

If the gain does not exceed 0 dB at the phase crossover frequency fphase of the Bode diagram, the control system is stable. If the phase does not cross −180 degrees even when the gain exceeds 0 dB, the control system is also stable. In the present embodiment, the phase does not cross −180 degrees at any torsional resonance frequencies at the encoder scale side and at the mirror side. Therefore, the motor controller of the present embodiment can stably drive the galvano motor.

As described above, in the present embodiment, the phase crossover frequency fphase, and the torsion resonance frequencies fscale and fmirror satisfy the relation of fphase<fscale≦fmirror.

The phases at the torsion resonance frequencies fscale and fmirror are other than −180 degrees. Further, in order to be able to perform a more stable control, it is preferable that a phase at a frequency close to the torsion resonance frequency fscale or fmirror is also other than −180 degrees.

Each of various kinds of mirrors which have a different weight from one another can be attached to the galvano motor in the range of the specification. Therefore, it is preferable that each of the above conditions of the frequency in open-loop characteristics of the galvano motor is set so as to satisfy it when the heaviest mirror among mirrors applicable to a certain galvano motor is used.

The value of the torsion resonance frequency can be appropriately changed by changing the torsion spring constant and the inertia as represented by expressions 3 and 4.

As described above, in the present embodiment, the inner structure of the galvano motor is devised to control the torsion resonance frequency and to make the resonance stable in the control. Therefore, without applying a filter such as a notch filter which needs large calculation loads, in spite of a relatively low phase crossover frequency that is 3 kHz, a servo band up to around 1.5 kHz to 2 kHz which is close to the phase crossover frequency can be obtained. Therefore, according to the present embodiment, the response of the galvano motor can be improved.

Furthermore, in the present embodiment, the diameter of the motor shaft at the mirror side is greater than that at the encoder scale side in order to set the torsion resonance frequency to a desired value. Therefore, the number of the components needed does not change and the increase of the cost can be minimally suppressed. When an encoder is adopted as a rotating angle detector, a positioning operation can be performed with high resolution and high accuracy.

Therefore, according to the present embodiment, a galvano motor or a galvano motor system which is capable of rotationally deflecting an optical axis of a light beam with high accuracy and high velocity can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in the above embodiment, although the case where the motor shaft is constituted by a solid round bar has been described, instead of this, a motor shaft constituted by a hollow round bar can be used.

This application claims the benefit of Japanese Patent Application No. 2008-111291, filed on Apr. 22, 2008, which is hereby incorporated by reference herein in its entirety.

What is claimed is:

1. A galvano motor configured to scan or deflect light from a light source, the galvano motor comprising:
   a rotating shaft;
   a rotating drive unit configured to rotationally drive the rotating shaft; and
   a rotating angle detector which is joined to one end of the rotating shaft,
   wherein the rotating shaft is configured so that a deflection member which is heavier than the rotating angle detector at the other end opposite to the one end to which the rotating angle detector is joined,
   wherein when the deflection member is joined to the rotating shaft, a phase crossover frequency fphase in open-loop characteristics of the galvano motor, a torsion resonance frequency fscale between a center part of the rotating shaft and the rotating angle detector, and a torsion resonance frequency fmirror between the center part of the rotating shaft and the deflection member satisfy the relation of fphase<fscale≦fmirror, and
   wherein phases at the torsion resonance frequencies fscale and fmirror are other than −180 degrees.

2. A galvano motor according to claim 1,
   wherein a diameter of the rotating shaft at a joint side of the deflection member is greater than that of the rotating shaft at a joint side of the rotating angle detector.

3. A galvano motor system comprising:
   a galvano motor according to claim 1; and
   a motor controller configured to compare target angle information with rotating angle information from the rotating angle detector and perform a digital control of a rotating drive operation of the rotating shaft so that a difference between the target angle information and the rotating angle information is reduced.

* * * * *